United States Patent [19]

Fujiwara

[11] Patent Number: 5,472,067
[45] Date of Patent: Dec. 5, 1995

[54] SUPPORTING DEVICE FOR DISK BRAKE FRICTION PADS

[75] Inventor: Youichi Fujiwara, Nagoya, Japan

[73] Assignee: Nisshinbo Industries, Nihonbashi, Japan

[21] Appl. No.: 378,866

[22] Filed: Jan. 24, 1995

Related U.S. Application Data

[63] Continuation of Ser. No. 71,398, Jun. 4, 1993, abandoned.

[30] Foreign Application Priority Data

Jun. 8, 1992 [JP] Japan ................... 4-045158

[51] Int. Cl.$^6$ ................................... F16D 65/02
[52] U.S. Cl. .................... 188/73.36; 188/73.38; 188/205 A
[58] Field of Search ............... 188/73.38, 73.37, 188/73.36, 73.39, 73.35, 72.3, 205 A

[56] References Cited

U.S. PATENT DOCUMENTS

| | | | |
|---|---|---|---|
| 4,196,794 | 4/1980 | Matsumoto | 188/73.38 |
| 4,607,728 | 8/1986 | Kobayashi | 188/73.38 |
| 5,069,313 | 12/1991 | Kato et al. | 188/73.38 |
| 5,358,079 | 10/1994 | Brown | 188/73.38 |

FOREIGN PATENT DOCUMENTS

| | | | |
|---|---|---|---|
| 58-39823 | 3/1983 | Japan | 188/73.38 |
| 58-146730 | 9/1983 | Japan | 188/73.38 |
| 58-146731 | 9/1983 | Japan | 188/73.38 |
| 58-146733 | 9/1983 | Japan | 188/73.38 |
| 58-207534 | 12/1983 | Japan | 188/73.38 |
| 59-10434 | 4/1984 | Japan . | |
| 1-255729 | 10/1989 | Japan | 188/73.38 |
| 2172068 | 9/1986 | United Kingdom | 177/73.38 |

*Primary Examiner*—Douglas C. Butler
*Attorney, Agent, or Firm*—Nikaido Marmelstein Murray & Oram

[57] ABSTRACT

A novel supporting device for the friction pads of a disk brake is provided in which a frame straddling a disk rotating in tandem with the wheel is fixed to a non-rotating member of the vehicle, and a caliper slidable in the axial direction of the rotating disk is set in the fixed frame. One end of each of two friction pads are interlocked with the frame such that the trailing ends of the pads slide in the axial direction of the rotating disk. The supporting device incorporates a thin plate set in the interlocking area between the fixed frame and the friction pads wherein the thin plate is molded into a pair of sliding members corresponding in structure to the interlock between the fixed frame and the friction pads. The lower edge of a connecting bar between the two sliding members is bent to a width narrower than the width of the recessed groove molded in the fixed frame for the rotating disk, thereby forming an anti-slippage ledge which abuts the recessed groove to regulate the sliding of the friction pads in the axial direction of the rotating disk. Moreover, a pair of retaining arms integrally extend from the inner end of each sliding member, and lock onto the slide face of the fixed frame to prevent the displacement of the supporting device in the direction orthogonal to the axis of the rotating disk.

11 Claims, 6 Drawing Sheets

SUPPORTING DEVICE FOR DISK BRAKE FRICTION PADS

This application is a continuation of application Ser. No. 08/071,398 filed Jun. 4, 1993, now abandoned.

BACKGROUND OF THE INVENTION

1. Field of the Invention

This invention relates to a supporting device for the friction pads of a disk brake in which a frame guides the sliding and retraction of a pair of friction pads.

2. Description of Prior Art

Generally for this type of disk brake the supporting device, commonly referred to as a pad liner, is mounted on the frame in order to minimize the sliding resistance between the frame and the friction pads.

This supporting device is molded from a thin steel bent in a form so as to be mountable in a recessed groove or on a projecting edge of the frame. The supporting device is equipped with a sliding member which becomes the sliding face for the friction pads and several brackets which elastically retain the friction pads within the frame.

The bracket can also be of a type other than just an elastic retaining member. For example, a dual-purpose type which will also act to prevent slippage of the supporting device in the axial direction of the rotating disk, as disclosed in Utility Model Gazette No. 59(1984)-10434, can be used.

PROBLEMATIC POINTS WITH CONVENTIONAL SUPPORTING DEVICES

In conventional supporting devices, each bracket serves a dual function of impeding movement of the supporting device in the axial direction of the rotating disk, and preventing its displacement from the frame. As a consequence, braking operations, vibrations, and other vehicle operating parameters concentrate excessive stresses on the brackets which cause wear-and-tear of the supporting device.

SUMMARY OF THE INVENTION

The objective of this invention is to provide a supporting device of greater durability for disk brake friction pads, thereby resolving the problems of conventional supporting devices.

This invention is a novel supporting device for the friction pads of a disk brake in which a frame, straddling a disk rotating in tandem with the wheel, is fixed to a non-rotating member of the vehicle and a caliper, slidable in the axial direction of the rotating disk, is set in the fixed frame wherein, one end of each of two friction pads are interlocked with the frame such that the trailing ends of the pads slide in the axial direction of the rotating disk. The supporting device is comprised of a thin plate set in the interlocking area between the fixed frame and the friction pads wherein the thin plate is molded into a pair of sliding members corresponding in structure to the interlock between the fixed frame and the friction pads. The lower edge of the connecting bar between the two sliding members is bent to a width narrower than the width of the recessed groove molded in the fixed frame for the rotating disk, thereby forming an anti-slippage ledge which abuts the recessed groove to regulate the sliding of the friction pads in the axial direction of the rotating disks. Moreover, a pair of retaining arms integrally extend from the inner end of each sliding member and lock onto the slide face of the fixed frame to prevent the displacement of the supporting device in the direction orthogonal to the axis of the rotating disk.

This invention further includes the following features:

the anti-slippage ledge and retaining arms have been integrally molded as individual parts, thus preventing excessive stresses on the retaining arms and consequent the recessed groove originally molded in the fixed frame for the rotating disk can be used without modification as the mating member which regulates the movement of the anti-slippage ledge, thus no further machining of the frame is required; and an anti-rattle plate which makes elastic contact with the caliper can be integrally molded in the supporting device to prevent rattling of the friction pads.

BRIEF DESCRIPTION OF THE DRAWINGS

The invention will be described by examples of various configurations and their operation thereof, with reference to the accompanying diagrams, in which.

DETAILED DESCRIPTION OF THE PREFERRED EMBODIMENTS

EXAMPLE 1

An example of this invention will be explained with reference to the diagrams.

A. Overall Configuration

Figure 1:
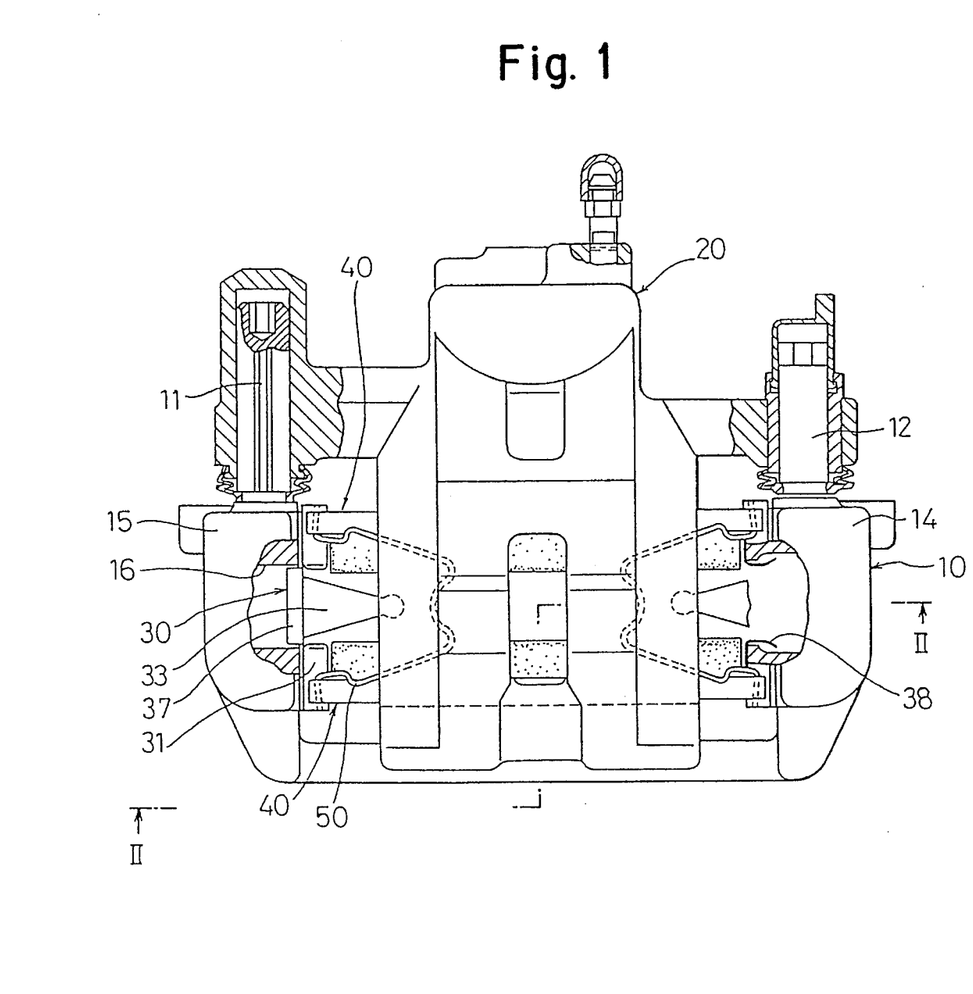
FIG. 1 is a planar diagram of a disk brake related to this invention.
Figure 2:
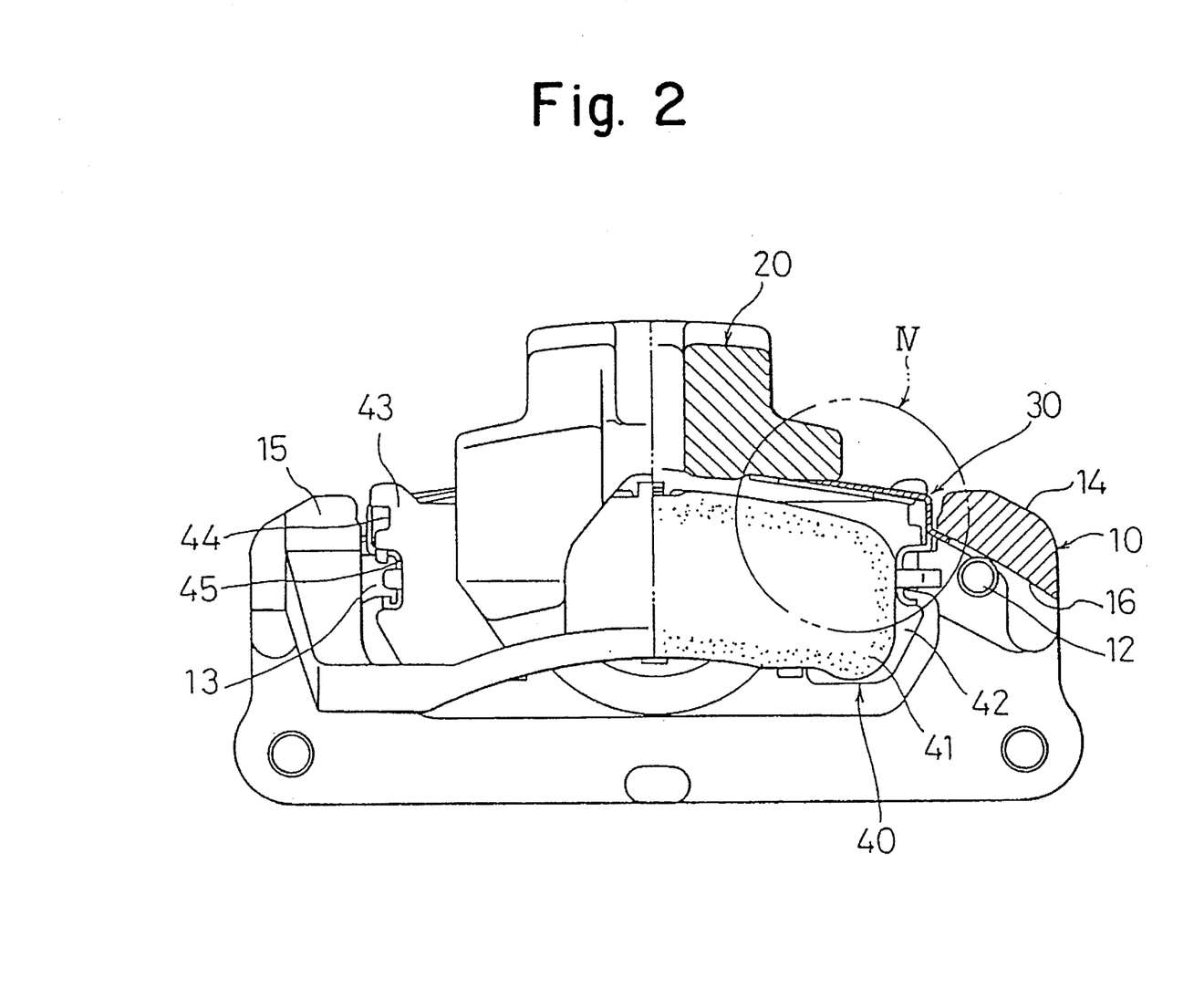
FIG. 2 is a partial cross sectional diagram of Part II—II of FIG. 1.

FIG. 1 and FIG. 2 each illustrate a configuration of the disk brake. A shoulder 14, 15 is molded on each end of the fixed frame 10, and guide pins 11, 12 are mounted on to each shoulder respectively by means of which the caliper 20 slides and retracts. A pair of friction pads 40, 40 are set facing each other inside the caliper 20 by means of the supporting device 30.

B. Friction Pads

The structure of the friction pad 40 is well known in the art, and each friction pad is configured from a friction material 41 and a back plate 42 to which an ear is molded on the end. A locking groove 44 and guide groove 45 are molded stepwise onto the end face of each ear.

The locking groove 44 is used to lock the base end of the half-W shaped retracting spring 50 which functions to fully separate both friction pads 40, 40 and prevent dragging of the rotating disk during non-braking periods.

The guide groove 45 is fitted to a protrusion 13 on the inner surface of the fixed frame 10 and functions to support the friction pad. Accordingly, the guide groove 45 is shaped to correspond to the protrusion 13, but is slightly larger. This configuration enables the friction pads to slide and retract via the supporting device 30 mounted to the protrusion 13.

The friction pad 40 and the fixed frame 10 fitting can be in the form of a dovetailing mesh, a joggled joint, or a variety of other types of interlocking fittings.

C. Supporting Device

Figure 3:
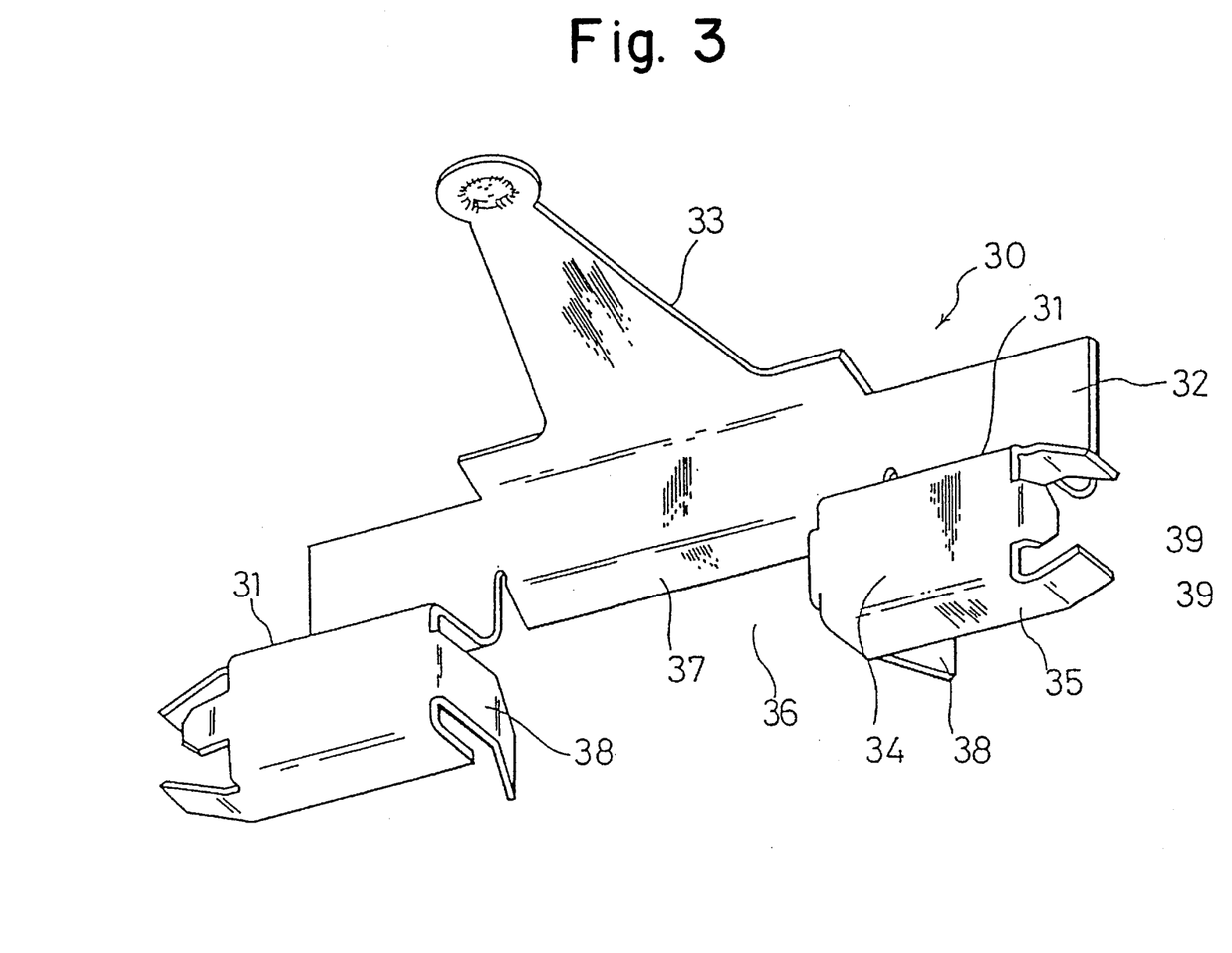
FIG. 3 is an oblique diagram of the supporting device.

The supporting device 30 is molded from a single thin steel sheet bent into a shape as shown in FIG. 3, and specifically is comprised of two sliding faces 31, 31 molded at a specified distance from each other in the same plane, a connecting bar 32 bent at right angles to and linking the two sliding surfaces 31, 31, an anti-rattle plate 33 extending from the center of the top of the connecting bar 32 in the direction of the sliding surfaces 31, 31 and which makes elastic contact with the caliper 20, an abutting face 34 bent parallel to the connecting bar 32 and integrally extending down from the outer edge of each sliding surface 31, and a bottom face 35 extending from the end of the abutting face 34 and bent back towards the connecting bar 32.

The sliding face 31, abutting face 34, and bottom face 35 are bent into the shape of an equilateral square bracket to form a sliding member mountable onto the protrusion 13 of the fixed frame 10.

A central opening 36 is formed between the two sliding faces 31, 31, wherein a specified width of the lower segment of the connecting bar 32 bordering the central open space 36 extends in the opposite direction from the anti-rattle plate 33 to form an anti-slippage ledge 37.

Figure 4:
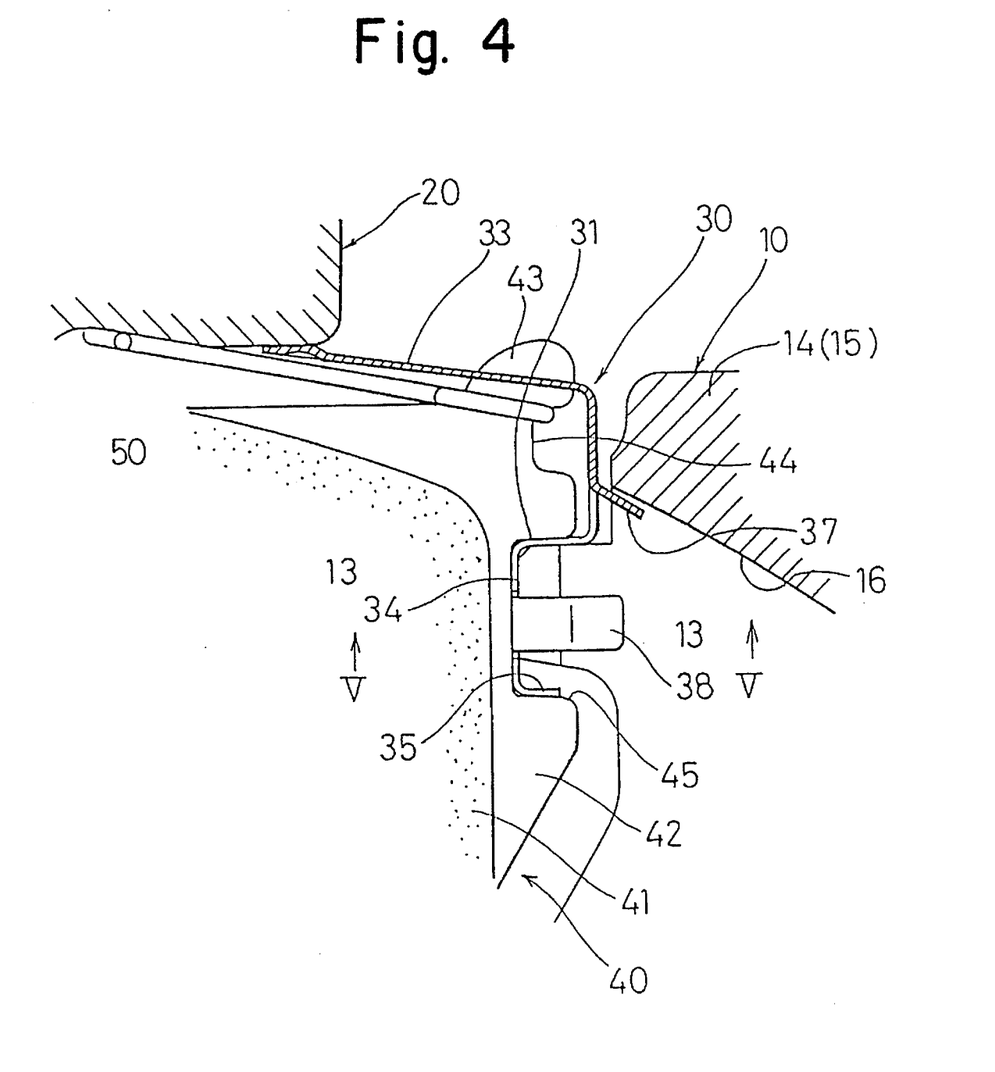
FIG. 4 is an enlarged diagram of Part IV of FIG. 2.

As shown in the enlarged diagram of FIG. 4, the anti-slippage ledge 37 abuts against the inner wall surface (recessed groove 16 for the rotating disk) of each shoulder 14, 15 of the fixed frame 10 and acts as a locking bar to resist the force acting on the supporting device 30 in the axial direction of the rotating disk. Thus, there is no particular necessity for the anti-slippage ledge to bear a spring force and make elastic contact with the inner surfaces of the shoulder 14, 15.

Figure 5:
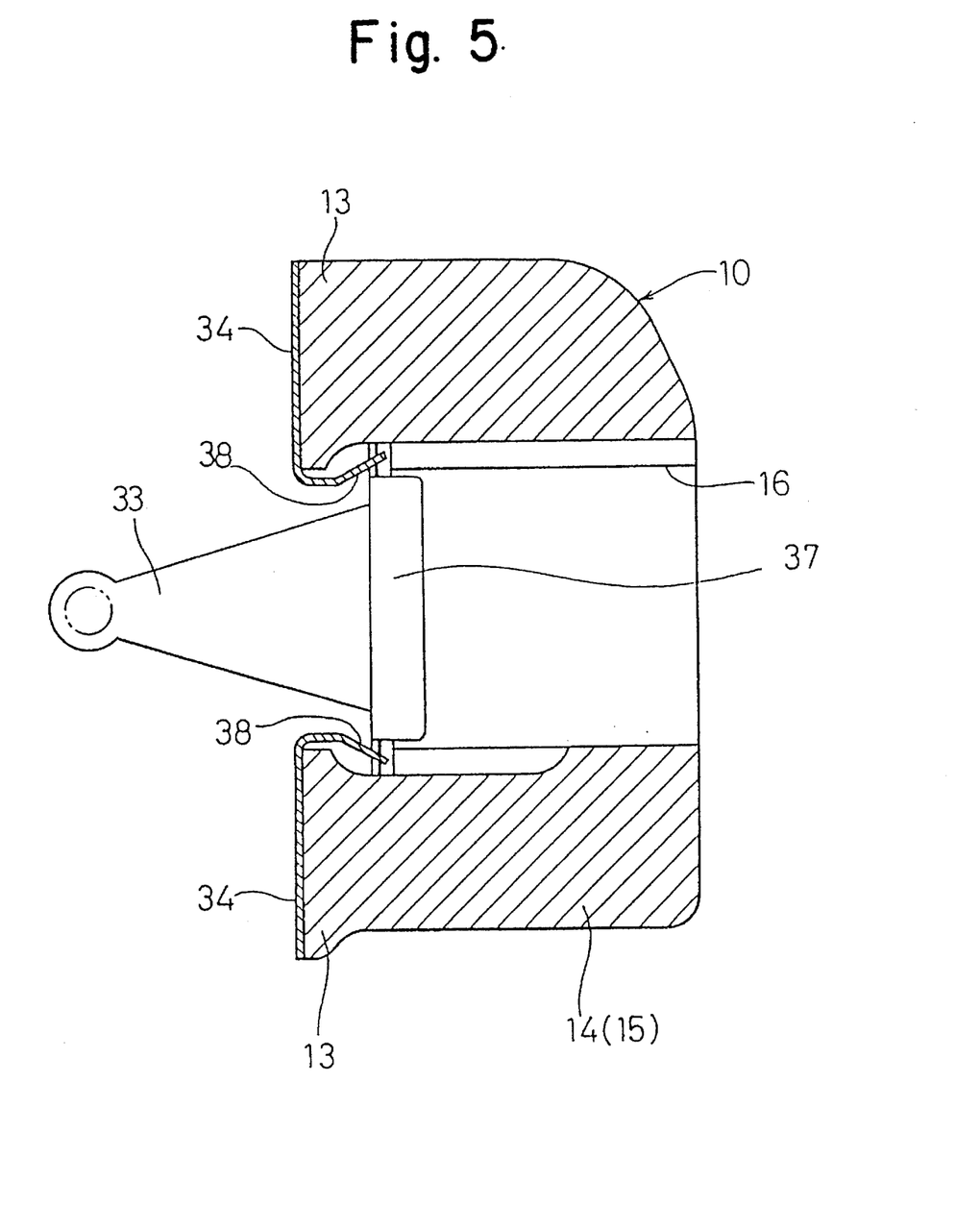
FIG. 5 is a diagram of Part V—V of FIG. 4 as viewed in the direction of the arrows.

As shown in FIG. 5, the anti-slippage ledge 37 is molded to be slightly narrower than the width of the recessed groove 16 in the fixed frame 10.

In addition, a retaining arm 38 is formed from an extended narrow strip of the inner end face of each sliding member, and which is bent back in the direction of the sliding surface 31. A pair of retaining arms cover the side faces of each protrusion 13 of the fixed frame 10, and function to restrain and prevent the supporting device from being displaced in the direction orthogonal to the axis of the rotating disk.

This example illustrates a case where the pair of retaining arms 38 cover the inner surfacing facing each protrusion 13, but the retaining arms can cover the external surface of the protrusions.

A guide piece 39 projecting externally from each sliding face 31, 31, the abutting face 34, and the bottom face 35 functions to smoothly guide the friction pad 40 during assembly, but can be omitted.

Operation of Example 1

The operation of the disk brake is explained below.

A. Sliding of the Friction Pad

As shown in FIG. 1, when brake fluid is supplied from the cylinder, one of the friction pads 40 is pressed against the rotating disk (not shown in the diagram) but at the same time the caliper 20 receives the hydraulic reaction force of the brake fluid wherein the caliper starts to move along the pair of guide pins 11, 12. This action causes the other friction pad 40 to be pressed against the rotating disk. Thus a braking force is generated in the same manner as in conventional systems. In addition, the friction pad 40 slides along the supporting device mounted on the fixed frame 10 again in the same manner as conventional systems, but some functional points of the supporting device 30 of the present invention differ from conventional systems as will be explained below.

B. Sideways Movement of Supporting Device is Blocked

As the guide groove 45 abuts against each sliding face of the supporting device 30 and the pair of friction pads 40, 40 start to slide, the supporting device 30 receives a force to move in the axial direction of the rotating disk (i.e., the sliding direction of friction pads 40).

The anti-slippage ledge 37 of the supporting device 30 is normally, as shown in FIG. 4 and FIG. 5, positioned close to the inner wall surface (recessed groove 16) of each shoulder 14, 15. However, when a force acts upon the supporting device 30 in the axial direction of the rotating disk, the anti-slippage ledge 37 abuts against the recessed groove 16, thereby preventing the supporting device 30 from moving in the axial direction of the rotating disk (i.e., the sliding direction of friction pads 40).

Accordingly, this avoids the transfer of the axial force (the force in the sliding direction of the friction pads 40) acting on the supporting device 30 to the other retaining arms 38, 38.

C. Supporting Device is Not Displaced

As shown in FIG. 4 and FIG. 5, the pair of retaining arms 38, 38 molded onto the supporting device 30 are locked onto the side face of the protrusion 13 of the fixed frame 10 thus preventing the supporting device 30 from falling out of the fixed frame.

D. Rattling Noise is Prevented

If the supporting device 30 has an anti-rattle plate 33 mounted to make elastic contact with caliper 20 as shown in FIG. 4, the spring force of the anti-rattle arm 33 will press the friction pad 40 towards the center of the rotating disk. This prevents vibration of the friction pad 40, thus effectively preventing any rattling noise during non-braking periods.

EXAMPLE 2

Figure 6:
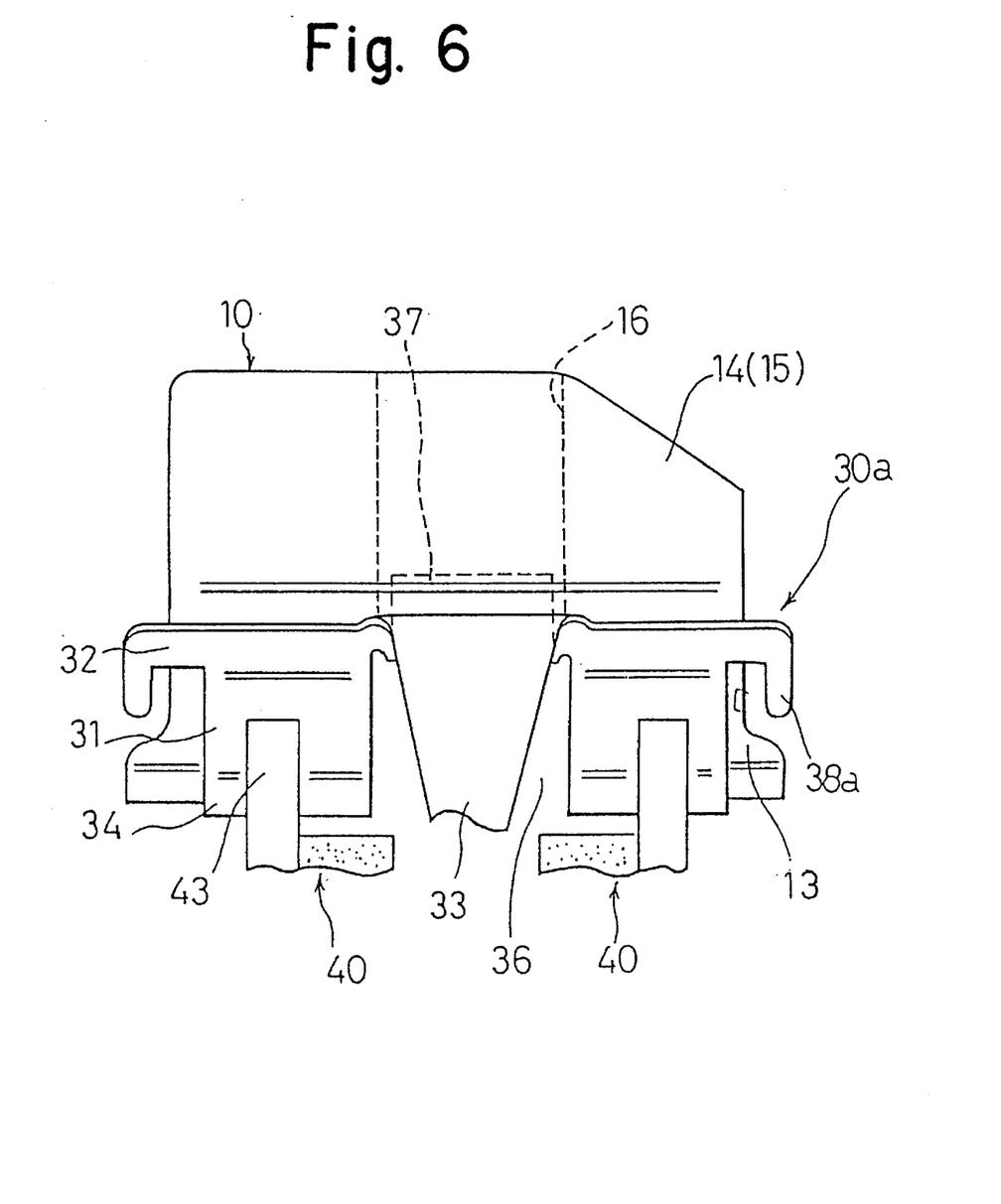
FIG. 6 is a partial oblique diagram of a disk brake equipped with a supporting device as embodied in Example 2.

FIG. 6 illustrates another example where a supporting device 30a has been mounted.

An explanation for those components which are the same as in Example 1 and have the same numerical identifier will be omitted here.

In this example, the pair of retaining arms 38a, 38a are molded by extending a small piece from each outer end of the connecting bar 32, wherein the piece is bent such that it can lock onto the outer surface of the protrusion 13 of the fixed frame 10.

If a recessed notch is molded onto the side face external to the fixed frame 10, then the retaining arm 38a can be locked onto this notch. In this case, there is no ledge formed by the protrusion 13 on the outward side face external to the fixed frame 10. This enables the unit to be more compact.

Although a specific embodiment of the instant invention has been described abvoe and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A supporting device for a pair of friction pads in a disk brake system having a fixed frame which straddles a disk rotating in tandem with the wheel and is fixed to a non-rotating member of a vehicle, and a caliper which is slidable in an axial direction of the rotating disk and set in the fixed frame, one end of each of the pair of friction pads being interlocked with the frame such that trailing ends of the pads slide in the axial direction of the rotating disk, the supporting device comprising:

an anti-rattling plate positioned between the fixed frame and the friction pads;

a connecting bar formed along a first side edge thereof on a first end of said anti-rattling plate;

first and second sliding members each with an inner end and extending from opposing ends of said connecting bar so as to be positioned between the interlock of the fixed frame and a corresponding friction pad;

an anti-slippage ledge formed on a second side edge of said connecting bar between said first and second sliding members, said anti-slippage ledge abutting into a recessed groove in the fixed frame formed so as to accommodate the rotating disk, said anti-slippage ledge being further formed so as to regulate sliding of the pair of friction pads in the axial direction of the rotating disk;

first and second retaining arms each integrally formed with and extending from an inner end of a corresponding sliding member, each of said first and second retaining arms being further formed so as to lockingly connect with a corresponding side face of the fixed frame with a clearance and formed to a width narrower than a width of the recessed grove of the fixed frame thereby preventing displacement of the supporting device in a direction orthogonal to the axis of the rotating disk; and     wherein said anti-slippage ledge and said first and second retaining arms are integrally formed with said connecting bar and said first and second sliding members, respectively.

2. A supporting device according to claim 1, wherein said anti-slippage ledge is formed with a width narrower than the recessed groove.

3. A supporting device for a pair of friction pads in a disk brake system having a frame which straddles a disk rotating in tandem with the wheel and is fixed to a non-rotating member of a vehicle, and a caliper which is slidable in an axial direction of the rotating disk and set in the fixed frame, one end of each of the pair of friction pads being interlocked with the frame such that trailing ends of the pads slide in the axial direction of the rotating disk, the supporting device comprising:

an anti-rattling plate positioned between the fixed frame and the friction pads;

a connecting bar formed along a first side edge thereof on a first end of said anti-rattling plate;

first and second sliding members each extending from opposing ends of said connecting bar so as to be positioned between the interlock of the fixed frame and a corresponding friction pad;

an anti-slippage ledge formed on a second side edge of said connecting bar between said first and second sliding members, said anti-slippage ledge abutting into a recessed groove in the fixed frame formed so as to accommodate the rotating disk, said anti-slippage ledge being further formed so as to regulate sliding of the pair of friction pads in the axial direction of the rotating disk;

first and second retaining arms each extending from opposing outer ends of said connecting bar and formed so as to engage outer side faces of the fixed frame with a clearance and formed to a width narrower than a width of the recessed groove of the fixed frame; and     wherein said anti-slippage ledge and said first and second retaining arms are integrally formed with said connecting bar and said first and second sliding members, respectively.

4. A supporting device according to claim 3, wherein said anti-slippage ledge is formed with a width narrower than the recessed groove.

5. A friction pad supporting plate in a disk brake system having a frame which straddles a disk rotating in tandem with the wheel and is fixed to a non-rotating member of a vehicle, and a caliper which is slidable in an axial direction of the rotating disk and set in the fixed frame, one end of each of a pair of friction pads being interlocked with the frame such that trailing ends of the pads slide in the axial direction of the rotating disk, the supporting plate comprising:

a connecting bar positioned between the fixed frame and the friction pads;

first and second sliding members each with an inner end and each extending form opposing ends of said connecting bar so as to be positioned between the interlock of the fixed frame and a corresponding friction pad;

an anti-slippage ledge formed on a second side edge of said connecting bar between said first and second sliding members, said anti-slippage ledge abutting into a recessed grove in the fixed frame formed so as to accommodate the rotating disk, said anti-slippage ledge being further formed so as to regulate sliding of the pair of friction pads in the axial direction of the rotating disk; and     first and second retaining arms each integrally formed with the extending from the inner end of a corresponding sliding member, each of said first and second retaining arms being further formed so as to lockingly connect with a corresponding side face of the fixed frame with a clearance and formed to a width narrower than a width of the recessed groove of the fixed frame thereby preventing displacement of the supporting device in a direction orthogonal to the axis of the rotating disk.

6. A supporting device according to claim 5, wherein a said anti-slippage ledge is formed with a width narrower than the recessed groove.

7. A supporting device according to claim 5, wherein said anti-slippage ledge and said first and second retaining arms are integrally formed with said connecting bar and said first and second sliding members, respectively.

8. A friction pad supporting plate in a disk brake system having a frame which straddles a disk rotating in tandem with the wheel and is fixed to a non-rotating member of a vehicle, and a caliper which is slidable in an axial direction of the rotating disk and set in the fixed frame, one end of each of a pair of friction pads being interlocked with the frame such that trailing ends of the pads slide in the axial direction of the rotating disk, the supporting plate comprising:

a connecting bar positioned between the fixed frame and the friction pads wherein said connecting box has opposing outer ends;

first and second sliding members each extending from opposing ends of said connecting bar so as to be positioned between the interlock of the fixed frame and a corresponding friction pad;

an anti-slippage ledge formed on a second side edge of said connecting bar between said first and second sliding members, said anti-slippage ledge abutting into a recessed groove in the fixed frame formed so as to accommodate the rotating disk, said anti-slippage ledge being further formed so as to regulate sliding of the pair of friction pads in the axial direction of the rotating disk;

first and second retaining arms each extending from said opposing outer ends of said connecting bar and formed so as to engage outer side faces of the fixed frame with a clearance and formed to a width narrower than a width of the recessed groove of the fixed frame; and wherein said anti-slippage ledge and said first and second retaining arms are integrally formed with said connecting bar and said first and second sliding members, respectively.

9. A supporting device according to claim 8, wherein a said anti-slippage ledge is formed with a width narrower than the recessed groove.

10. A disk brake system, comprising:

a disk brake rotating in tandem with a wheel of a vehicle;

a frame which straddles said rotating disk and is fixed to a non-rotating member of the vehicle;

a caliper which is slidable in an axial direction of said rotating disk and set in said fixed frame;

a pair of friction pads, one end of each of said pair of friction pads being interlocked with said frame such that trailing ends of said pads slide in the axial direction of said rotating disk;

a supporting plate positioned between said fixed frame and said rotating disk;

a supporting plate positioned between said fixed frame and said friction pads, said supporting plate including a connecting bar, first and second sliding members each with an inner end each extending from opposing ends of the connecting bar so as to be positioned between the interlock of said fixed frame and a corresponding friction pad, an anti-slippage ledge formed on a second side edge of the connecting bar between the first and second sliding members, and first and second retaining arms each integrally formed and extending from an inner end of a corresponding sliding member, wherein the anti-slippage ledge and said retaining arms are integrally formed as individual parts and said anti-slippage ledge abuts into a recessed groove in said fixed frame formed so as to accommodate said rotating disk, the anti-slippage ledge being further formed so as to regulate sliding of said friction pads in the axial direction of said rotating disk, and each of the first and second retaining arms is further formed so as to lockingly connect with a corresponding side face of said fixed frame with a clearance and formed to a width narrower than a width of the recessed groove of the fixed frame thereby preventing displacement of the supporting device in a direction orthogonal to the axis of said rotating disk.

11. A disk brake system, comprising:

a disk rotating in tandem with a wheel of a vehicle;

a frame which straddles said rotating disk and is fixed to a non-rotating member of the vehicle;

a caliper which is slidable in an axial direction of said rotating disk and set in said fixed frame;

a pair of friction pads, one end of each of said pair of friction pads being interlocked with said frame such that trailing ends of said pads slide in the axial direction of said rotating disk;

a supporting plate positioned between said fixed frame and said friction pads, said supporting plate including a connecting bar, first and second sliding members each extending from opposing ends of the connecting bar so as to be positioned between the interlock of said fixed frame and a corresponding friction pad, an anti-slippage ledge formed on a second side edge of the connecting bar between the first and second sliding members, and first and second retaining arms each extending from opposing outer ends of the connecting bar, wherein the anti-slippage ledge abuts into a recessed groove in said fixed frame formed so as to accommodate said rotating disk, the anti-slippage ledge being further formed so as to regulate sliding of said friction pads in the axial direction of said rotating disk, and each of the first and second retaining arms is further formed so as to engage outer side faces of said fixed frame.

* * * * *